United States Patent
Govyadinov et al.

(10) Patent No.: US 7,314,772 B2
(45) Date of Patent: Jan. 1, 2008

(54) PHOTONIC DEVICE

(75) Inventors: Alexander Govyadinov, Corvallis, OR (US); Robert Newton Bicknell, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 250 days.

(21) Appl. No.: 11/080,113

(22) Filed: Mar. 14, 2005

(65) Prior Publication Data

US 2006/0202187 A1 Sep. 14, 2006

(51) Int. Cl.
*H01L 21/00* (2006.01)

(52) U.S. Cl. .............................. 438/34; 438/22; 438/23; 438/24; 438/35; 257/431; 257/432

(58) Field of Classification Search ................... 438/22, 438/23, 24, 29, 34, 25, 42; 136/243; 257/431, 257/432
See application file for complete search history.

(56) References Cited

U.S. PATENT DOCUMENTS

| | | | |
|---|---|---|---|
| 6,583,350 B1 | 6/2003 | Gee et al. | |
| 6,611,085 B1 | 8/2003 | Gee et al. | |
| 6,711,200 B1 | 3/2004 | Scherer et al. | |
| 6,768,256 B1 | 7/2004 | Fleming et al. | |
| 6,795,231 B1 | 9/2004 | Koscielniak | |
| 7,067,215 B2 * | 6/2006 | Lazaroff et al. | 429/38 |
| 2003/0123827 A1 | 7/2003 | Salerno et al. | |
| 2003/0132705 A1 | 7/2003 | Gee et al. | |

OTHER PUBLICATIONS

J.G. Fleming et al., All-Metallic Three-Dimensional Photonic Crystals With a Large Infrared Bandgap, Nature, May 2, 2002, pp. 52-55, vol. 417, MacMillan Magazine Ltd.

International Search Report and Written Opinion of the International Searching Authority dated Jul. 14, 2006.

* cited by examiner

*Primary Examiner*—Fernando L. Toledo

(57) ABSTRACT

Embodiments of methods, apparatuses, devices, or systems for forming a photonic device are described.

42 Claims, 5 Drawing Sheets

PHOTONIC DEVICE

BACKGROUND

Photonic devices may be utilized in a number of applications, such as in display devices including digital projectors, or other light based applications such as reflectors and light emitting diodes, for example. Photonic devices suitable for use in applications such as these may be formed from a variety of materials or may be formed by use of a variety of processes. The selection of materials or processes may result in the formation of a photonic device having particular properties. For example, a photonic device suitable for use in a digital projector may be formed from tungsten, and may be formed by use of one or more deposition processes, for example. However, photonic devices formed in this manner may not exhibit one or more characteristics that may be desirable in a number of applications.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description when read with the accompanying drawings in which:

DETAILED DESCRIPTION

Figure 1A:
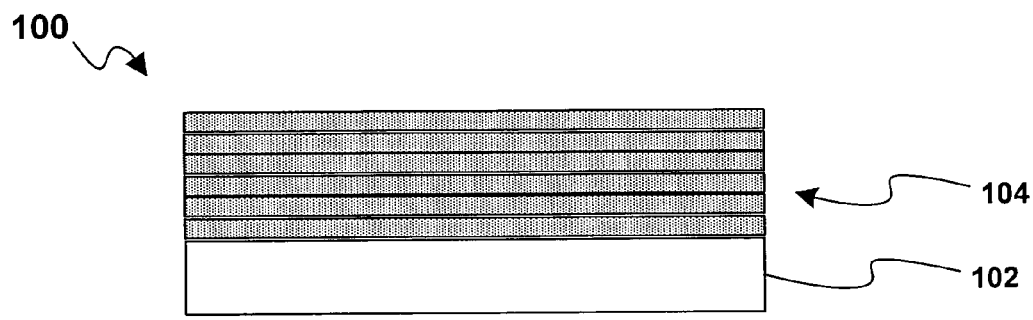
FIGS. 1a, 1b and 1c illustrate various stages of formation of an embodiment of a photonic device.

In the following detailed description, numerous specific details are set forth to provide a thorough understanding of claimed subject matter. However, it will be understood by those skilled in the art that claimed subject matter may be practiced without these specific details. In other instances, well-known methods, procedures, components or circuits have not been described in detail so as not to obscure claimed subject matter.

Photonic devices may be formed from one or more materials, and may be formed such that a variation in the dielectric constant of the material may exist along one or more directions through the device. For example, a periodic variation, a nonperiodic variation or a combination of periodic and nonperiodic variations along one or more directions may exist through the device. If a periodic variation in the dielectric constant exists, the periodic variation may vary on the order of wavelengths of light, and the device may be referred to as a periodic device, for example. Alternatively, if a device has a combination of periodic and nonperiodic variations, the device may be referred to as a quasiperiodic device, for example. The variation in the dielectric constant may result in a photonic device having particular optical properties, such as one or more optical modes, for example. A photonic device may be configured such that optical modes in one or more directions for one or more wavelengths of light may be modified or suppressed. For example, light having a particular wavelength, or light within one or more bands of wavelengths may not be allowed to propagate through the device in one or more directions. In one context, this capability to suppress light may be referred to as zero spectral emissivity. Additionally, in this context, the one or more wavelengths of light that may not be allowed to propagate through the device may be referred to as the band gap of the photonic device, which may additionally be referred to as the photonic band gap (PBG). Light, as used in this context, refers generally to electromagnetic radiation within a portion of the electromagnetic spectrum, which includes radiation within the visible portion of the electromagnetic spectrum, having a wavelength substantially within the range of approximately 380 nanometers (nm) to 760 nm, for example, although the claimed subject matter is not so limited. For example, electromagnetic radiation not within the visible spectrum may be incorporated in at least one embodiment, such as infrared (IR) light, which may have a wavelength substantially within the range of 800 to 15000 nm, for example.

As alluded to previously, photonic devices may be utilized in a number of applications. For example, photonic devices may be utilized in light source applications including digital projector device applications and display applications; integrated circuit applications; light emitting diodes; reflectors, anti-reflectors and modulators; nanoscopic lasers or photonic sensors; IR light sources; photovoltaic devices and stealth technology, although it is worthwhile to note that these are just a few potential applications, and the claimed subject matter is not limited to any particular application. Additionally, photonic devices that may be suitable for use in one or more of these applications may comprise numerous materials or may be formed from one or more processes, and the particular material or process may depend at least in part on the particular application, for example.

Photonic devices may be capable of having suppressed spectral emissivity for one or more wavelengths of light, such as for one or more bands of wavelengths, and may have low or negligible spectral emissivity in one or more directions or dimensions. For example, a photonic device capable of having suppressed spectral emissivity in two dimensions for light having one or more wavelengths may be referred to as a 2D photonic device. Similarly, a photonic device capable of eliminating or reducing the propagation of light having one or more wavelengths in three dimensions may be referred to as a 3D photonic device. Photonic devices such as 2D or 3D devices may be capable of having a photonic band gap in one or more directions, wherein light having particular wavelengths may be emitted or suppressed. For example, a 3D photonic device may have a 3D photonic band gap. Additionally, a 2D photonic device may have a 2D photonic band gap, wherein light having a particular wavelength or band of wavelengths may be suppressed in two dimensions. Additionally, the 2D photonic device may emit light not within the 2D band gap, which may include visible light or near infrared (IR) light, which may be useful in light source applications. Photonic devices such as 2D and 3D photonic devices may be formed from a variety of materials, may be formed into one or more structures, and may be formed by use of one or more fabrications processes. A 3D photonic device may comprise one or more materials formed into a particular structure, such as one or more materials combined to form a particular arrangement of elements. The arrangement of elements may comprise overlapping beams, which may be formed into a "woodpile" structure, as just an example, which may result in the formation of a photonic device having a 3D photonic band gap, which may have the capability of being suppressed in three dimensions. Additionally, devices formed in this manner may exhibit a 3D photonic band gap, and may have one or more additional degrees of freedom, explained in more detail later. Alternatively, a photonic device may be formed from one or more materials, and may be formed to have a plurality of holes formed therein. In this embodiment, material variations exist along one or more directions of the material, or the diameter of the holes may be on the order of one or more wavelengths of light, and this may result in the formation of a photonic device having a band gap, such as a 2D photonic band gap. However, the claimed subject matter is not limited to these particular structures, as will be explained in more detail later.

Figure 1B:
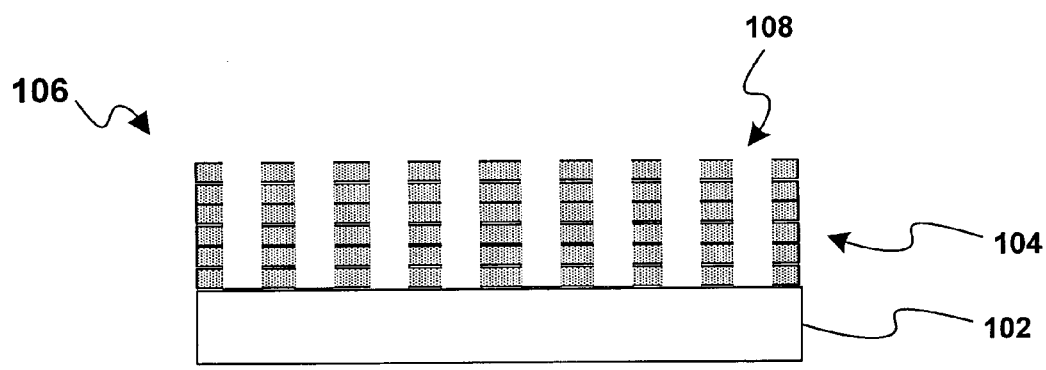
Figure 1C:
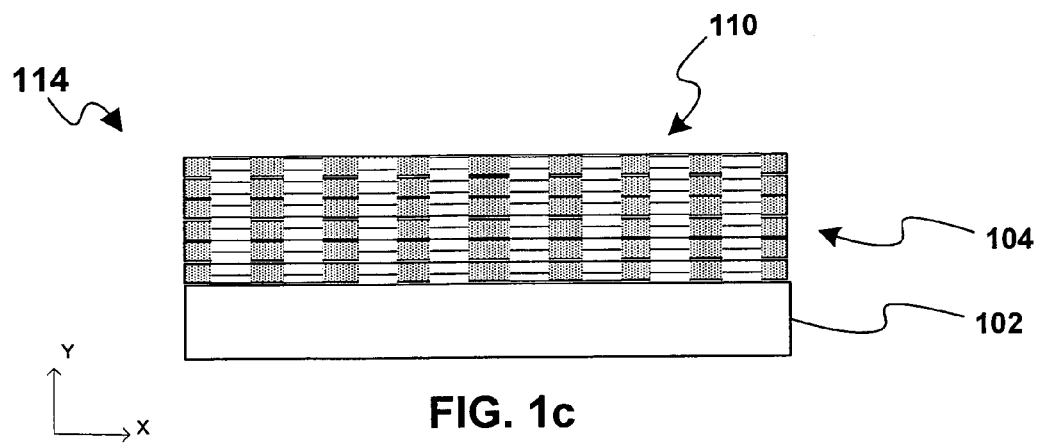

Referring now to FIG. 1, there are illustrated multiple stages of formation of a photonic device, in accordance with at least one embodiment. Illustrated in FIGS. 1a, 1b and 1c are cross sectional views of several stages of formation of a photonic device that may have a particular photonic band gap, including a 2D or 3D photonic band gap. The photonic device may have the capability of emitting or suppressing light within one or more wavelengths or bands of wavelengths, such as by emitting light having visible or near infrared wavelengths, and suppressing light not within these one or more wavelengths or bands of wavelengths, for example. FIG. 1a illustrates a cross sectional view of a partially formed photonic device 100, comprising multiple material layer stack 104 that may be formed on a substrate 102 although, in alternative embodiments, no substrate may be utilized, for example. Substrate 102 may comprise silicon, but the claimed subject matter is not so limited. Additionally, although stack 104 is illustrated as six material layers, the claimed subject matter is not limited to any particular number of material layers, and particular selection of the number of material layers may depend on the one or more materials utilized to form the layers, or the desired properties of the photonic device being formed. However, in at least one embodiment, layer stack 104 may be substantially formed from one or more materials having one or more optical properties, such as refractive index. For example, one or more portions of layer stack 104 may be formed from Tungsten, Tantalum, Iridium, Molybdenum, Niobium, Platinum, Rhenium, Rhodium, Ruthenium, Silver, Zirconium, Aluminum or one or more other metals; one or more semiconductive materials; one or more dielectric materials; plastics; polymers; ceramics or one or more composite materials, although the claimed subject matter is not so limited. Additionally, the one or more materials may be deposited by use of one or more deposition processes, such as chemical vapor deposition (CVD), physical vapor deposition (PVD), atomic layer deposition (ALD), molecular beam epitaxy (MBE), sputter, ion and evaporative depositions, for example, although, again, the claimed subject matter is not so limited. Additionally, selection of a particular deposition process may depend at least in part on the particular material or combination of materials being deposited. The one or more layers of material layer stack 104 may be formed to a particular thickness. The particular thickness may depend on factors including the number of material layers, the deposition processes being utilized to deposit the one or more materials, or the particular device being fabricated. Additionally, the substrate or material layers may have a particular thickness in the z direction, perpendicular to the illustrated view, not shown in detail. In one particular embodiment, device 100 may comprise 6 layers of tungsten, formed to a thickness within the range of approximately 0.05-1.5 μm, and may be formed by one or more CVD processes, for example.

Illustrated in FIG. 1b is a cross sectional view of a partially formed photonic device 106, which may comprise device 100 with one or more portions of material layer stack 104 at least partially removed, such as from a patterning process. In at least one embodiment, a plurality of holes 108 may be formed in at least a portion of the material layer stack 104. The holes may be formed to have a variety of configurations, such as a repeating, partially repeating or non-repeating pattern or evenly spaced cylindrical holes formed through the one or more material layers of stack 104, such as to form a periodic, nonperiodic or quasiperiodic structure. Additionally, one or more holes may be formed substantially behind the illustrated holes, such as in the z direction, not shown in detail. Additionally, other configurations for the one or more holes exist, including rectangular, prismatic, such as non-ideal prismatic, elliptical or triangular holes, for example, and configuration of the holes is not limited to any particular geometric shape. Additionally, the holes 108 may be formed to have a diameter on the order of one or more wavelengths of light, for example, and light having one or more of those wavelengths may be suppressed when provided to the photonic device. A photonic device having this configuration may be tuned by altering the hole configuration or layout, such that particular optical properties are obtained. However, light suppression may not be effected in the y direction by using a photonic device formed in this manner, as will be explained in more detail with reference to FIG. 1c. The holes 108 may be formed by use of numerous patterning processes, including one or more etching processes, for example. One or more etching processes may include plasma etching, reactive ion etching, wet etching, including chemical and electrochemical wet etching, but selection of a particular etching process may depend at least in part on the one or more materials comprising layer stack 104, or may depend on the particular patterning being performed, for example. One or more holes 108 may be formed by one or more machining processes, such as one or more drilling processes, laser processes, sand processes, electro-discharge (EDM) processes, or focused ion beam (FIB) processes, although the claimed subject matter is not limited in this respect, and, again, selection of particular processes to form one or more holes 108 may depend at least in part on the one or more materials utilized to form one or more material layers 104. However, in at least one embodiment, wherein material layer stack 104 are substantially formed from tungsten, one or more etching or drilling processes may be utilized to selectively remove one or more portions of material layer stack 104, to form one or more holes 108.

Illustrated in FIG. 1c is a cross sectional view of a photonic device 114, which may comprise device 106 with one or more holes 108 at least partially filled with two or more materials. Device 114 comprises multiple material layer stack 104 formed on substrate 102, and a plurality of at least partially filled holes 110. Filled holes 110 may have a variety of configurations. The multiple holes may be formed in a variety of repeating or non-repeating patterns, and may include additional holes formed substantially behind the illustrated holes, such as in the z direction, not shown in detail, such as described previously. The holes may be filled with two or more materials, which may be layered, and may comprise any number of layers, for example. In at least one embodiment, the filled holes 110 may be filled with two or more materials. At least one of the materials comprises a dielectric material, such as silicon oxide, silicon nitride, silicon oxinitride, tungsten silicon oxide, tungsten silicon nitride, silicon carbide, amorphous silicon, aluminum nitride, diamond, magnesium oxide, zirconia, hafnia, alumina, or combinations thereof. However, the claimed subject matter is not so limited, and selection of the materials to fill one or more holes 108 may depend at least in part on the particular device being formed, for example. Additionally, if one or more of the holes 108 are at least partially filled with two or more materials, at least a portion of the materials may be processed after being deposited in the one or more holes 108, for example. Again, selection of one or more processes may depend at least in part on the material(s) used to form partially filled holes 110. In at least one embodiment, the material(s) may be processed by use of one or more chemical-mechanical polish (CMP) or electro-chemical-mechanical polish (ECMP) processes, for example. This may result in removal at least a portion of the material(s), and the material(s) may be back polished such as to result in the material(s) being substantially planar with the top surface of layer stack 104. However, again, this is just an example, and the claimed subject matter is not so limited. A device formed in this manner may exhibit one or more properties, such as a photonic band gap. Due at least in part to the manner in which the device is formed, the device may exhibit desired optical properties, including band gap in more than the x and z directions, but also in the y direction, as just an example, and the photonic device may thus be referred to as having a 3D photonic band gap. Additionally, a device formed in this manner may provide the capability to tune the optical properties of the photonic device, such as by selecting a fill material or materials that will provide the desired band gap. This additional variable may provide an enhanced capability to operate in an extended portion of the electromagnetic spectrum, and maybe referred to as an additional degree of freedom. This degree of freedom may provide the capability to tune the band gap of a device, such as to produce a device capable of operating in the near-IR range, although particular properties may depend on the selection of a fill material.

Referring now to FIG. 2, there are illustrated cross sectional views of multiple stages of formation of a photonic device, in accordance with one or more embodiments. Illustrated in FIGS. 2a, 2b, 2c and 2d are several stages of formation of a photonic device that may have a particular photonic band gap, such as a 3D band gap. FIG. 2a illustrates a cross sectional view of a partially formed photonic device 120, comprising a material layer 124 that may be formed on a substrate 122, although, in alternative embodiments, no substrate may be utilized, for example. Material layer 124, which may be referred to as a sacrificial layer, may be formed from one or more materials having one or more optical properties, for example, including one or more metals, dielectrics, semiconductors, ceramics, polymers, cermets or other types of material. Material layer 124 may be formed by one or more deposition processes, such as CVD, ALD, PVD, MBE, sputter, ion and evaporative depositions, for example, although, again, the claimed subject matter is not so limited. Additionally, selection of a particular deposition process may depend at least in part on the particular material or combination of materials being deposited, for example. Additionally, material layer 124 may be formed to a particular thickness, including a thickness in the z direction (not illustrated) perpendicular to the illustrated view, not shown in detail. However, the particular thickness may depend on factors including the number of material layers, the deposition processes being utilized to deposit the one or more materials, or the particular device being fabricated, for example. In one particular embodiment, material layer 124 may be formed from Tungsten and may be formed to a thickness within the range of approximately 0.05-1.5 µm.

Figure 2A:
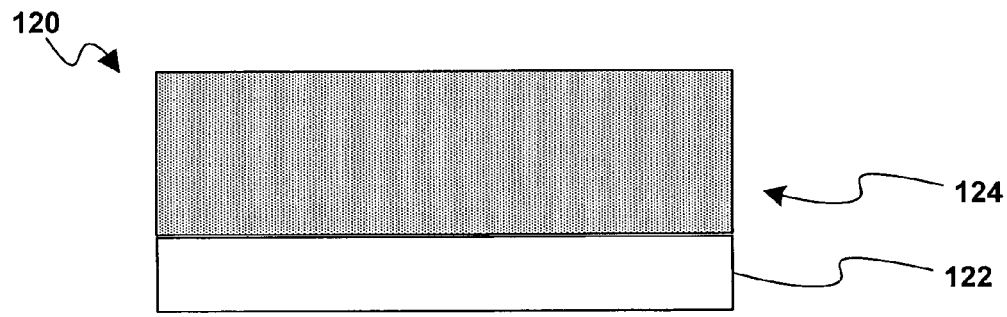
FIGS. 2a, 2b, 2c and 2d illustrate various stages of formation of an embodiment of a photonic device.
Figure 2B:
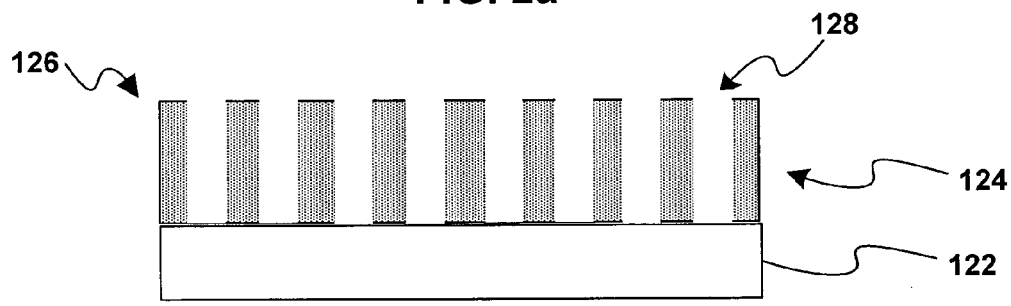

Illustrated in FIG. 2b is a partially formed photonic device 126, which may comprise device 120 after one or more portions of material layer 124 have been at least partially removed, such as from a patterning process, for example. In at least one embodiment, a plurality of holes 128 may be formed in at least a portion of the material layer 124. The holes may be formed to have a variety of configurations, such as a repeating, partially repeating or non-repeating pattern of cylindrical holes formed through at least a portion of the material layer 124. Additional holes may be formed substantially behind the illustrated holes, such as in the z direction, not shown in detail, although other hole configurations exist, including rectangular, prismatic such as non-ideal prismatic, elliptical or triangular hole configurations. The particular configuration of the holes is not limited to any particular geometric shape. Additionally, as described with reference to FIG. 2b, the holes 128 may be formed to have a diameter on the order of one or more wavelengths of light, and light having one or more of those wavelengths may be suppressed when provided to the photonic device. The holes 128 may be formed by use of numerous patterning processes, including one or more etching processes, for example. One or more etching processes may include plasma etching, reactive ion etching, or wet etching for example, but selection of a particular etching process may depend at least in part on the one or more materials comprising material layer 124, or may depend on the particular patterning being performed, for example. Additionally, one or more holes 128 may be formed by one or more machining processes. Machining processes may comprise one or more drilling processes, although the claimed subject matter is not limited in this respect, and, again, selection of particular processes to form one or more holes 128 may depend at least in part on the one or more materials utilized to form one or more material layer 124. However, in at least one embodiment, wherein material layer 124 is substantially formed from tungsten, one or more chemical vapor etching processes may be utilized to selectively remove one or more portions of material layer 124, to form one or more holes 128.

Figure 2C:
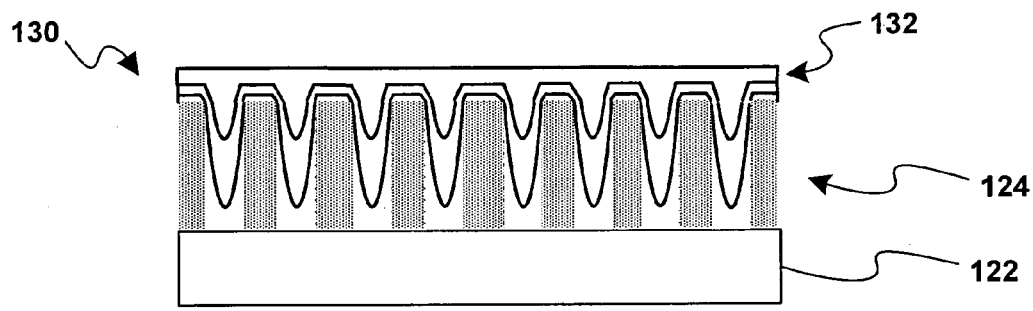

Illustrated in FIG. 2c is a photonic device 130, which may comprise device 126 after two or more materials 132 are formed on or over one or more portions, such as on or over material layer 124 or one or more holes 128 of FIG. 2b to form two or more material layers. As illustrated in FIG. 2c, materials 132 may be deposited on or over at least a portion of device 130, and, although illustrated as three layers of material 132, it is worthwhile to note that the claimed subject matter is not so limited. For example, two layers of material may be deposited or four or more layers of material may be deposited over at least a portion of the material layer 124 or one or more holes 128. The material layers may be comprised of one or more materials, and the one or more materials may vary between materials 132. The one or more materials 132 may be deposited by use of one or more deposition processes, and may comprise a number of materials or combinations of materials, but the claimed subject matter is not limited in this respect. For example, a plurality of deposition processes may be utilized to deposit one or more materials 132. The deposition processes may form one or more material layers on at least a portion of material layer 124 or holes 128, for example. However, in at least one embodiment, one or more dielectric materials, such as silicon oxide, silicon nitride, silicon oxinitride, tungsten silicon oxide, tungsten silicon nitride, silicon carbide, amorphous silicon, aluminum nitride, diamond, magnesium oxide, zirconia, hafnia, or alumina may be deposited by use of one or more deposition processes, as explained previously. Selection of one or more materials to form one or more layers 132 may depend at least in part on the particular device being formed, for example.

Figure 2D:
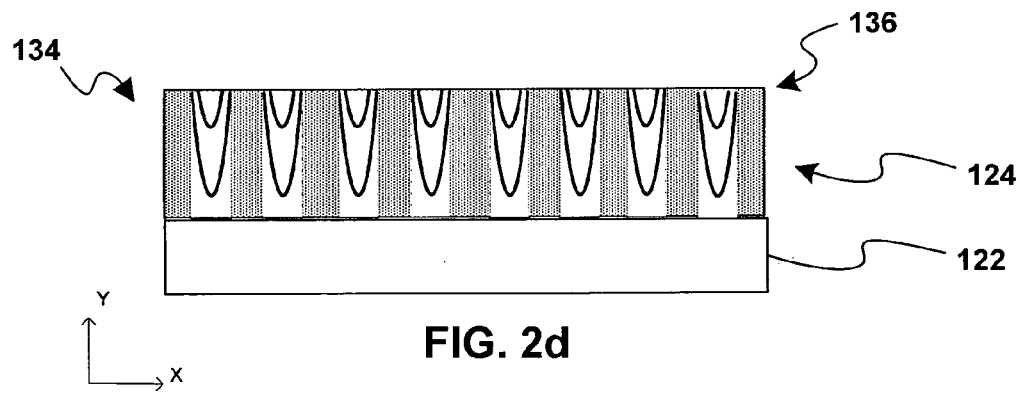

Illustrated in FIG. 2d is a photonic device 134, which may comprise device 130 after being processed. In this embodiment, one or more portions of device 130 may be processed, such as by use of CMP or ECMP, for example, in order to produce device 134. This may result in removal at least a portion of the material layers 132, and, in this embodiment, one or more portions of material layers 132 may be back polished. Back polishing may be utilized to result in the material(s) being substantially planar with the top surface of device 134, although again, this is just an example, and the claimed subject matter is not so limited. The material layers may be back-polished such as to produce a device having a plurality of layered materials formed in the holes, and may comprise radially layered materials in at least one embodiment. Additionally, although not illustrated in detail, one or more portions of device 134 may be removed by etching, such as one or more portions of layers 132, or one or more portions of material layer 124, for example. Etching may remove a substantial portion of material layer 124 by use of one or more chemical etching processes, although, of course, the claimed subject matter is not so limited. Thus, a device 134 having a particular photonic band gap may be formed, and due at least in part to the manner in which the device is formed, the device may exhibit a band gap in three dimensions, and may be referred to as having a 3D photonic band gap, for example. A device formed in this manner may provide the capability to tune the optical properties of the photonic device, such as by selecting a fill material or materials that will provide the desired optical properties, which may provide an additional degree of freedom, such as explained with reference to FIG. 1c, above. Additionally, as alluded to previously, one or more of the devices as illustrated in FIGS. 1a-1c and FIGS. 2a-2d may be formed from one or more methods or materials that may provide the capability to form a device having particular photonic characteristics. The photonic characteristics may be varied by varying the materials or particular configuration of one or more portions of the device, for example.

Figure 3A:
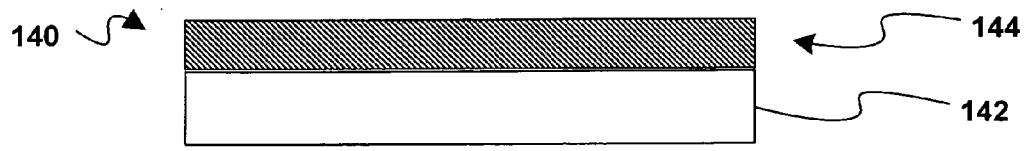
FIGS. 3a, 3b, 3c, 3d, and 3e illustrate various stages of formation of an embodiment of a photonic device.

Referring now to FIGS. 3a, 3b, 3c, 3d and 3e, there are illustrated cross sectional views of several stages of formation of a photonic device that may have a particular photonic band gap, such as a 3D photonic band gap. The device may be capable of emitting or suppressing light within one or more wavelengths or bands of wavelengths and directions. The photonic device described and illustrated may be referred to as a "woodpile" structure, comprising alternating layers of "logs" that may be evenly spaced, for example. The materials used to form the logs may have a particular dielectric constant, and material used elsewhere in the structure may have one or more additional dielectric constants, for example. FIG. 3a illustrates a partially formed photonic device 140, comprising a substrate 142, with a material layer 144 formed thereon although, in alternative embodiments, no substrate may be utilized, for example. Substrate 142 may comprise any materials like metals, dielectrics, semiconductors, ceramics, cermets, plastics or silicon, for example. Material layer 144 may comprise one or more materials, such as one or more dielectric materials silicon oxide, silicon nitride, silicon oxinitride, tungsten silicon oxide, tungsten silicon nitride, silicon carbide, amorphous silicon, aluminum nitride, diamond, magnesium oxide, zirconia, hafnia, or alumina, for example. Material layer 144 may be formed by use of one or more deposition processes, such as CVD, PVD, or ALD, for example, although, again, the claimed subject matter is not so limited. Layer 144 may be formed to a particular thickness, such as a thickness in the y direction and in the z direction (not shown), perpendicular to the illustrated cross section, although the particular thickness may depend on factors including the number of material layers, the deposition processes being utilized to deposit the one or more materials, or the particular device being fabricated, for example.

Figure 3B:
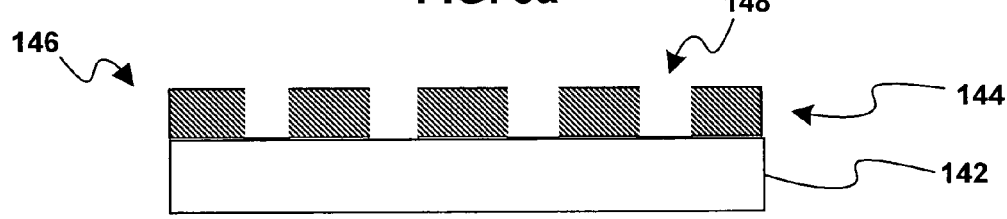

Illustrated in FIG. 3b is a device 146, which may comprise device 140 after one or more portions of material layer 144 are at least partially removed, such as from a patterning process. In at least one embodiment, a plurality of channels 148 may be formed in at least a portion of the material layer 144. The channels may be formed to have a variety of configurations, such as a repeating, partially repeating or non-repeating pattern of evenly or unevenly spaced rectangular channels. The channels may be formed through the one or more portions of material 144, and, although not illustrated, may be formed to extend in the z direction, although other configurations for the one or more channels exist, including prismatic or pyramidal, but configuration of the channels is not limited to any particular geometric shape, for example. The channels 148 may be formed by use of numerous patterning processes, including one or more etching processes, for example. One or more etching processes may include plasma etching, reactive ion etching, wet etching, drilling or micromachining, but selection of a particular process may depend at least in part on the one or more materials 144, or may depend on the particular patterning being performed, for example. Additionally, one or more channels 148 may be formed by one or more machining processes, such as one or more drilling processes. However, in at least one embodiment, wherein material layer 144 is substantially formed from polysilicon, one or more reactive plasma etching processes may be utilized to selectively remove one or more portions of material layer 144 to form one or more channels 148, for example.

Figure 3C:
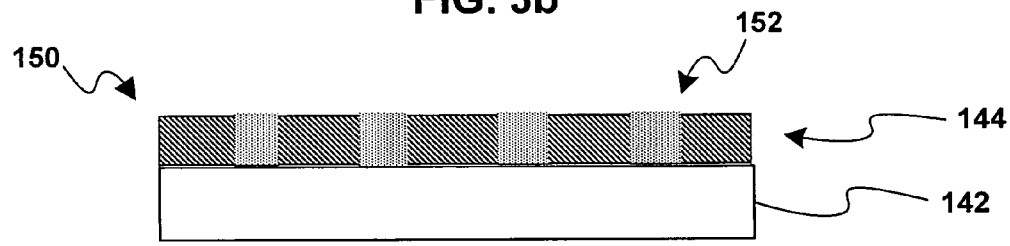

Illustrated in FIG. 3c is device 150, which may comprise device 146 after one or more channels 148 are at least partially filled with one or more materials 152. The channels may be filled with a single material, or may be filled with multiple materials, for example. However, in at least one embodiment, the filled channels 148 may be filled with one or more materials including silicon oxide, silicon nitride, silicon oxinitride, tungsten silicon oxide, tungsten silicon nitride, silicon carbide, amorphous silicon, aluminum nitride, diamond, magnesium oxide, zirconia, hafnia, or alumina, for example, although the claimed subject matter is not so limited. The one or more materials 152 may be processed after being deposited in the one or more channels 148, for example. Again, selection of one or more processes may depend at least in part on the material(s) used to fill channels 148. In at least one embodiment, the material(s) 152 may be processed by use of one or more chemical-mechanical polish processes, for example. This may result in removal of at least a portion of the material(s), and the material(s) may be back polished such as to result in the material(s) being substantially planar with the top surface of material layer 144, although again, this is just an example, and the claimed subject matter is not so limited.

Figure 3D:
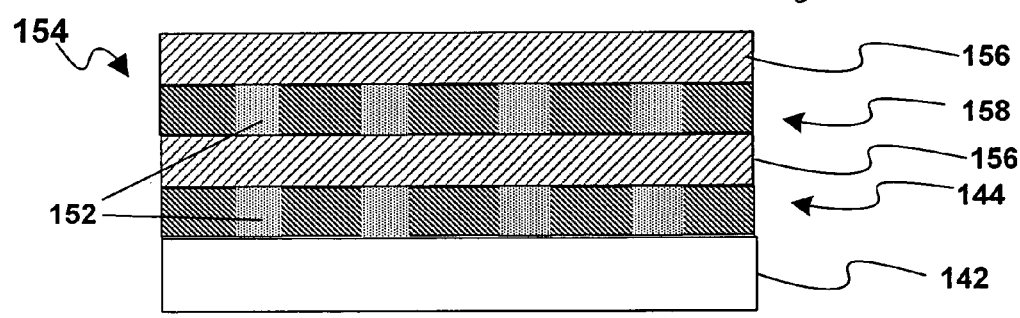

Illustrated in FIG. 3d is a cross sectional view of a photonic device 154, which may comprise device 150 with multiple material layers formed thereon. The multiple material layers may comprise layers of filled channels 148, such as alternating layers of filled channels 148 wherein each layer is configured at a particular orientation with respect to a subsequent layer, such as perpendicular, as illustrated in this embodiment. However, it is worthwhile to note that this is just an example, and other configurations having differing orientations are in accordance with one or more other embodiments, and the claimed subject matter is not limited in this respect. Layers 156 and 158 may comprise layers formed in a similar manner or from similar materials as layer 144, and a resultant structure such as the aforementioned "woodpile" structure may be formed. Although illustrated as four layers, the claimed subject matter is not so limited, and may comprise a greater or lesser number of layers.

Figure 3E:
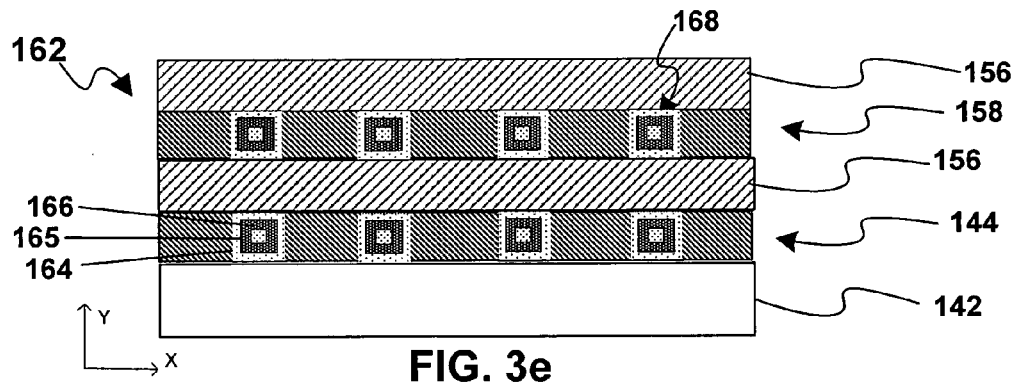

Illustrated in FIG. 3e is device 162, which may comprise device 154 with at least a portion of the material 152 removed, such as by etching, for example. Material 152 may be partially or completely removed, and the resultant cavity may be at least partially filled with two or more materials. Here, the resultant cavity is illustrated as being filled with three materials 164, 165 and 166, to form a filled cavity 168. The materials 164, 165 and 166 may be layered, such as to form radially layered materials in the cavity, for example, such as by use of multiple deposition processes. The materials 164, 165 and 166 may have dielectric constants that may vary between materials. Additionally, although illustrated as three materials layered to form the filled cavities 168, more or fewer materials may be utilized, such as two, four, five or six materials, for example, and the filled cavities 168 may not necessarily be layered. However, in this embodiment, the filled cavity 168 comprises radially layered materials 164, 165 and 166, and the materials may be layered to have a particular thickness, such as a thickness providing particular photonic properties. The removal of material 152 may be performed by one or more wet etching or dry etching processes. The one or more materials deposited into the cavity formed by the removal of material 152 may comprise one or more materials having photonic properties, such as metals, dielectrics, semiconductive materials, nano-composites, but selection of one or more materials to fill the cavities may depend at least in part on the particular device being formed. Additionally, one or more materials may be conductive, which may provide heating capabilities such as when device 162 is implemented as an incandescent emitter, as just an example. Depending at least in part on the one or more materials utilized to form one or more portions of device 162, the resultant device may exhibit desired optical properties, such as a 3D photonic band gap. Additionally, a device formed in this manner may have additional degrees of freedom for optical properties, due to the manner in which it is formed, such as by providing an additional variable by the incorporation of a fill material or materials in the cavities. A device formed in this manner may provide the capability to tune the optical properties of the photonic device. This may provide an enhanced capability to operate in an extended portion of the electromagnetic spectrum, such as in the near-IR range, although particular properties may depend on the selection of a fill material, for example. This enhanced capability may comprise an enhanced capability to suppress light, which may be derived from the plurality of materials utilized to form the device, for example. This additional degree of freedom may provide enhanced or suppressed optical characteristics in at least one dimension, and the additionally degree of freedom may provide a device formed to exhibit at least a 3D photonic band gap, but with an additional capabilities that may be desirable, for example.

Figure 4:
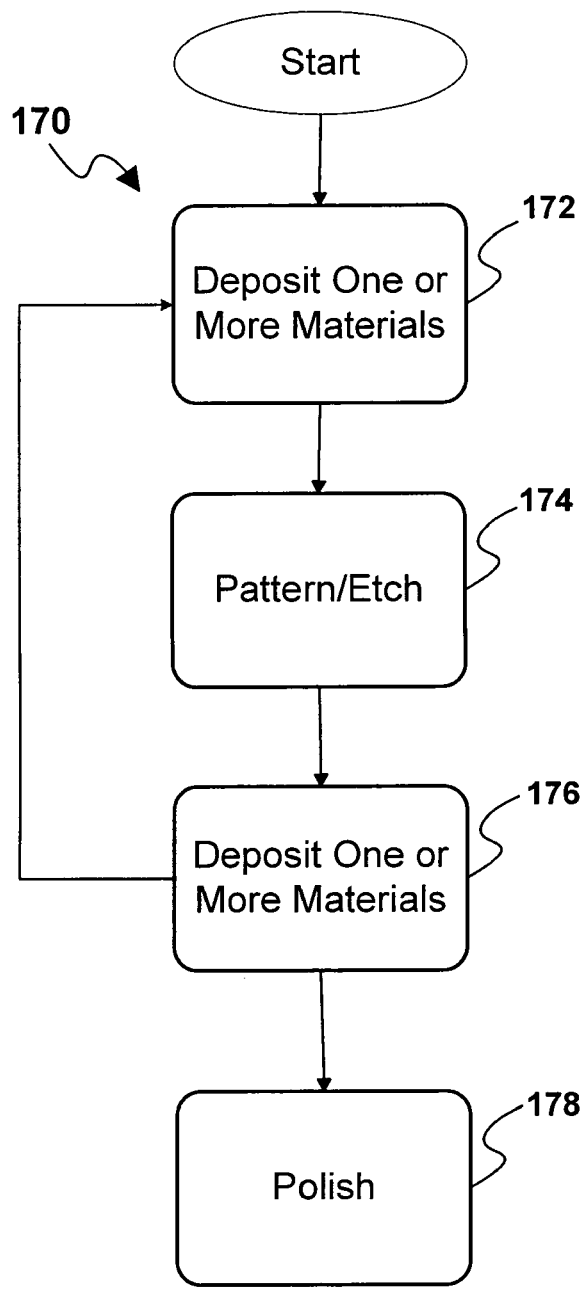
FIG. 4 is a flowchart illustrating an embodiment of a method to form a photonic device.

Formation of one or more portions of the devices as illustrated in the accompanying figures may comprise one or more processes, or numerous process operations, but claimed subject matter is not limited to any particular method of formation. Referring now to FIG. 4, one embodiment of a technique for forming a photonic device is illustrated by a flowchart 170. Such an embodiment may be employed to at least partially form a photonic device, as described below. The flowchart illustrated in FIG. 4 may be used to form a device at least in part, such as device 114 of FIG. 1c, or device 134 of FIG. 2d, for example, although claimed subject matter is not limited in this respect. Likewise, the order in which the blocks are presented does not necessarily limit claimed subject matter to any particular order. Additionally, intervening blocks not shown may be employed without departing from the scope of claimed subject matter.

Flowchart 170 depicted in FIG. 4 may, in alternative embodiments, be implemented in a combination of hardware and software or firmware, such as part of a computer controlled formation system capable of forming one or more portions of a photonic device device, and may comprise discrete or continual operations. In this embodiment, at block 172, one or more materials may be deposited on or over at least a portion of substrate, such as substrate 102 of FIG. 1a or substrate 122 of FIG. 2a, for example, although in alternative embodiments a substrate may not be utilized, for example. At block 174, a portion of the one or more materials may be patterned or etched, such as to remove at least a portion of the one or more materials deposited at block 172, such as to form one or more holes. At block 176, two or more additional materials may be deposited on or over at least a portion of substrate or one or more of the materials deposited at block 172, for example. One or more of the processes at blocks 174 or 176 may be substantially repeated in at least one embodiment, such as to form additional holes and to fill the holes with material. At block 178, one or more polishing operations may be performed on the material(s) deposited at blocks 172 or 176, such as to form a completed photonic device.

In this embodiment, at block 172, one or more materials may be deposited over a substrate, such as substrate 102 of FIG. 1a or substrate 122 of FIG. 2a, although in alternative embodiments a substrate may not be utilized, for example. One or more materials may comprise Tungsten, Tantalum, Iridium, Molybdenum, Niobium, Platinum, Rhenium, Rhodium, Ruthenium, Silver, Zirconium, Aluminum, one or more other metals, one or more semiconductive materials, dielectric materials, plastics, polymers, ceramics or composites, although the claimed subject matter is not so limited. The one or more materials may be deposited by use of one or more deposition processes, such as explained previously. The one or more materials may additionally be formed to a particular thickness. For example, in one particular embodiment, a layer of tungsten may be formed to a thickness within the range of approximately 0.05-1.5 µm, and may be formed by one or more CVD processes, for example.

At block 174, at least a portion of the one or more materials deposited at block 172 may be patterned or etched, such as to form one or more holes. In at least one embodiment, a plurality of holes may be formed in at least a portion of the one or more materials, and may be formed to have a variety of configurations. Configuration may include repeating, partially repeating or non-repeating pattern of evenly spaced cylindrical holes formed through the one or more materials. However, as explained previously, other hole configurations exist. The patterning or etching may comprise one or more processes, such as chemical vapor etching, reactive ion etching, or one or more machining processes such as drilling, micromachinng, but selection of a particular process may depend at least in part on the one or more materials deposited. However, if the one or more materials deposited substantially comprise tungsten, one or more chemical vapor etching processes may be utilized to selectively remove one or more portions of the one or more materials.

In this embodiment, at block 176, two or more additional materials may be deposited over the one or more materials deposited at block 172. In one embodiment, the two or more materials may be deposited in to the one or more holes formed at block 174, such as to at least partially fill the one or more holes with two or more materials, and the materials may be layered in to at least a portion of the holes, for example. Although numerous differing types of materials may be utilized, in at least one embodiment, one or more dielectric materials, such as silicon oxide, silicon nitride, silicon oxinitride, tungsten silicon oxide, tungsten silicon nitride, silicon carbide, amorphous silicon, aluminum nitride, diamond, magnesium oxide, zirconia, hafnia, alumina and etc., plastics, cermets and nanocomposites may be deposited in to the one or more holes. At block 178, at least a portion of the substrate or the two or more materials deposited may be polished. In at least one embodiment, the material(s) may be polished by use of CMP or ECMP, for example. This may result in removal at least a portion of the material(s), and the material(s) may be back polished such as to result in the multiple materials deposited being substantially planar with respect to the top surface, for example.

Figure 5:
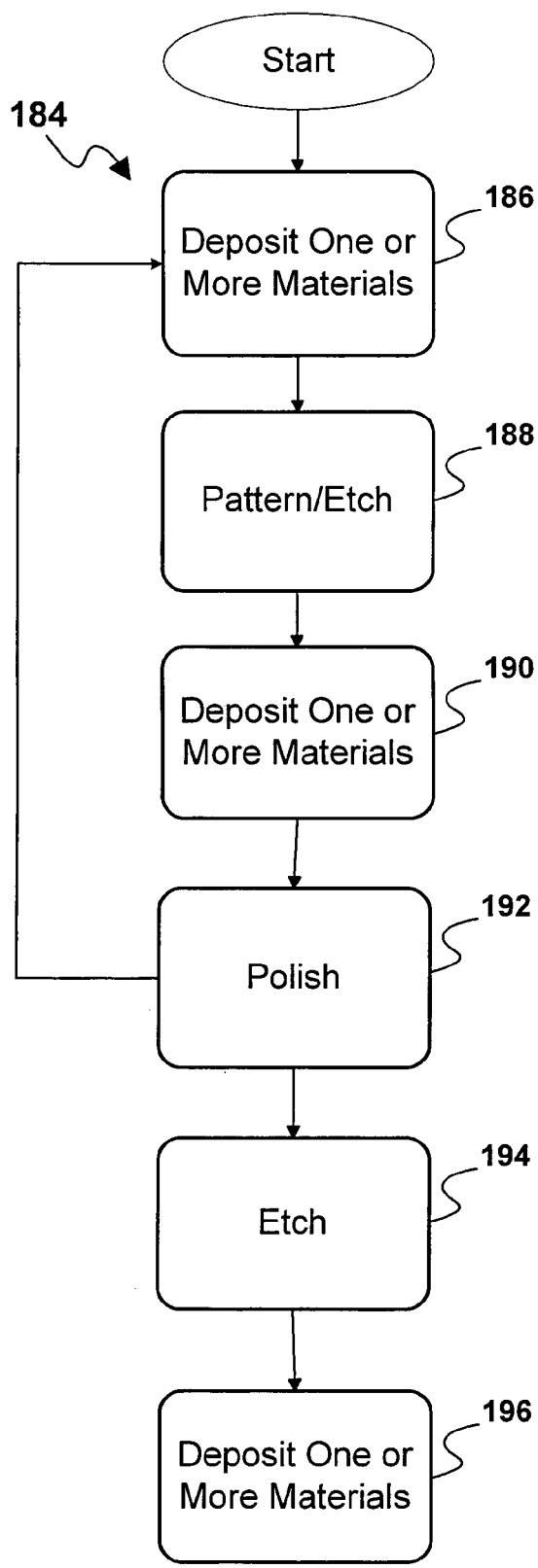
FIG. 5 is a flowchart illustrating an embodiment of a method to form a photonic device.

Referring now to FIG. 5, another embodiment of a technique for forming a photonic device is illustrated by a flowchart 184, and may be employed to at least partially form a photonic device such as device 162 of FIG. 3e, for example. However, the order in which the blocks are presented does not necessarily limit claimed subject matter to any particular order, and intervening blocks not shown may be employed without departing from the scope of claimed subject matter. In this embodiment, at block 186, one or more materials may be deposited on or over at least a portion of substrate although in alternative embodiments a substrate may not be utilized. At block 188, a portion of the one or more materials may be patterned or etched, such as to remove at least a portion of the one or more materials deposited at block 186, such as to form one or more channels. At block 190, two or more additional materials may be deposited on or over at least a portion of substrate or one or more of the materials deposited at block 186, for example. At block 192, one or more polishing operations may be performed on the two or more materials deposited at blocks 186 or 190. One or more of the preceding processes may be substantially repeated in at least one embodiment. At block 194, one or more portions of the materials deposited may be etched such as to form one or more cavities, and at block 196, two or more additional materials may be deposited, such as in at least a portion of the etched cavities. This may form one or more materials such as two or more layered materials in the cavities.

In this embodiment, at block 186, one or more materials may be deposited over a substrate, such as a silicon substrate, including substrate 142 of FIG. 3a. However, in alternative embodiments a substrate may not be utilized, for example. One or more materials may comprise an oxide material, for example, although the claimed subject matter is not so limited. The one or more materials may be deposited by use of one or more deposition processes, such as CVD or PVD, and one or more materials may be formed to a particular thickness. For example, in one particular embodiment, a layer of $SiO_2$ may be formed to a thickness within the range of approximately 0.05-1.5 μm, and may be formed by one or more CVD processes, for example.

At block 188, at least a portion of the one or more materials deposited at block 186 may be patterned or etched, such as to form one or more channels. In at least one embodiment, a plurality of channels may be formed in at least a portion of the one or more materials, and may be formed to have a variety of configurations, such as a repeating, partially repeating or non-repeating pattern of evenly spaced rectangular channels formed through the one or more materials. However, as explained previously, other channel configurations exist. The patterning or etching may comprise one or more processes, such as plasma etching, reactive ion etching, or one or more machining processes such as drilling, or FIB, but selection of a particular etching process may depend at least in part on the one or more materials deposited. However, if the one or more materials deposited substantially comprise an oxide material, one or more etching processes may be utilized to selectively remove one or more portions of the one or more materials.

In this embodiment, at block 190, two or more materials may be deposited over the one or more materials deposited at block 186. In one embodiment, the two or more materials may be deposited in sequence into the one or more channels formed at block 188. This may at least partially fill the one or more channels, and to form two or more layered materials, such as radially layered materials, for example, such as the three radially layered materials as illustrated in FIG. 3e, for example. Although numerous differing types of materials may be utilized, in at least one embodiment, polysilicon material(s) may be deposited in to the one or more channels, for example. At block 192, at least a portion of the substrate or the materials deposited may be polished, and one or more of the preceding processes may be substantially repeated in at least one embodiment. In one embodiment, the material(s) may be polished by use of CMP, for example. This may result in removal at least a portion of the material(s), and the material(s) may be back polished such as to result in the multiple materials deposited being substantially planar with respect to the top surface, for example. One or more of the blocks 186-192 may be at least partially repeated, such as to form a multi-layer device, and the one or more layers may be configured to have a differing orientation that a subsequent layer, such as by being 90 degrees rotated with respect from a subsequent layer, although this is just an example, and the claimed subject matter is not limited to any particular orientation. One or more block 186-192 may be at least partially repeated in this manner, such as to form a device such as device 154, for example. At block 194, one or more portions of the materials deposited may be etched, such as by removing at least a portion of the materials deposited at block 190, for example. This may form one or more cavities. At block 196, two or more materials may be deposited in to at least a portion of the formed cavities, such as to form two or more layered materials such as illustrated in FIG. 3e.

It is now appreciated, based at least in part on the foregoing disclosure, that a combination of hardware, software or firmware may be produced capable of forming the one or more devices described herein. It will additionally be understood that, although particular embodiments have just been described, claimed subject matter is not limited in scope to a particular embodiment or implementation. For example, a formation system capable of implementing one or more of the foregoing operations may comprise hardware, such as implemented to operate on a device or combination of devices as previously described, for example, whereas another embodiment may be in software and hardware, for example. Likewise, an embodiment of a system capable of implementing one or more of the above-mentioned operations may be implemented in firmware, or as any combination of hardware, software and firmware, for example. Additionally, all or a portion of one embodiment may be implemented to operate at least partially in one device, such as LEDs, a display, a computing device, a set top box, a cell phone, or a personal digital assistant (PDA), thermo photovoltaic devices, for example. Likewise, although claimed subject matter is not limited in scope in this respect, one embodiment may comprise one or more articles, such as a storage medium or storage media. This storage media, such as, one or more CD-ROMs or disks, for example, may have stored thereon instructions, that when executed by a system, such as a computer system, computing platform, a set top box, a cell phone, a personal digital assistant (PDA), or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard or a mouse, or one or more types of memory, such as static random access memory, dynamic random access memory, flash memory, or a hard drive, although, again, claimed subject matter is not limited in scope to this example.

In the preceding description, various aspects of claimed subject matter have been described. For purposes of explanation, specific numbers, systems or configurations were set forth to provide a thorough understanding of claimed subject matter. However, it should be apparent to one skilled in the art having the benefit of this disclosure that claimed subject matter may be practiced without the specific details. In other instances, well-known features were omitted or simplified so as not to obscure claimed subject matter. While certain features have been illustrated or described herein, many modifications, substitutions, changes or equivalents will now occur to those skilled in the art. It is, therefore, to be understood that the appended claims are intended to cover all such modifications or changes as fall within the true spirit of claimed subject matter.

The invention claimed is:

1. A method, comprising:
   forming a first material by use of one or more deposition processes;
   selectively removing at least a portion of the first material such as to form one or more holes in the first material, where the one or more holes have at least a partially non-repeating pattern;
   depositing a second material over the first material in the vicinity of the one or more holes; and
   depositing a third material over at least a portion of the second material to substantially fill the one or more holes, to form at least a portion of a photonic device exhibiting a band gap in at least one dimension, where the partially non-repeating pattern of substantially filled one or more holes forms an at least partially nonperiodic photonic device.

2. The method of claim 1, wherein said photonic device is further formed to exhibit at least a 2D band gap.

3. The method of claim 2, wherein said photonic device is further formed to exhibit a 3D photonic band gap and at least one additional degree of freedom.

4. The method of claim 1, wherein said holes are formed through the first material, such as to form an array of vertically oriented holes.

5. The method of claim 1, wherein said first material is deposited by one or more of the following: chemical vapor deposition (CVD), physical vapor deposition (PVD), atomic layer deposition (ALD), molecular beam epitaxy (MBE), sputter, ion and evaporative deposition.

6. The method of claim 1, wherein said second and third materials are deposited by one or more of the following: chemical vapor deposition (CVD), physical vapor deposition (PVD), and atomic layer deposition (ALD).

7. The method of claim 1, wherein said selective removing is performed by one or more of the following: drilling processes, laser processes, sand processes, electro-discharge (EDM) processes, or focused ion beam (FIB) processes.

8. The method of claim 1, wherein at least a portion of the holes comprise an arrangement of holes each having a particular configuration formed substantially through the first layer of material.

9. The method of claim 8, wherein said particular configuration comprises one or more of: cylindrical, rectangular, prismatic, elliptical and triangular.

10. The method of claim 9, wherein the arrangement comprises an evenly spaced arrangement of holes.

11. The method of claim 9, wherein the arrangement comprises an unevenly spaced arrangement of holes.

12. The method of claim 1, wherein the first material comprises one or more of the following: Tungsten, Tantalum, Iridium, Molybdenum, Niobium, Platinum, Rhenium, Rhodium, Ruthenium, Silver, Zirconium, Aluminum, semiconductive material, dielectric material, plastic, polymer, ceramic or combinations thereof.

13. The method of claim 1, wherein at least a portion of the second and third material comprise one or more of: silicon oxide, silicon nitride, silicon oxinitride, tungsten silicon oxide, tungsten silicon nitride, silicon carbide, amorphous silicon, aluminum nitride, diamond, magnesium oxide, zirconia, hafnia, alumina, and combinations thereof.

14. The method of claim 1, and further comprising processing at least a portion of said first, second and third materials by use of chemical mechanical polishing (CMP).

15. The method of claim 1, and further comprising:
   depositing a fourth material over at least a portion of the third material;
   depositing a fifth material over at least a portion of the fourth material; and
   depositing a sixth material over at least a portion of the fifth material to substantially fill the one or more holes.

16. The method of claim 1, wherein said photonic device is at least partially periodic and at least partially nonperiodic.

17. A method, comprising
   forming a first material layer by use of one or more deposition processes;
   selectively removing at least a portion of the first material layer such as to form one or more channels in the first material layer;
   depositing a second material over the first material layer, in the vicinity of the one or more channels, such as to partially fill one or more of the channels; and
   depositing a third material over at least a portion of the second material, such as to substantially fill the one or more of the channels; and repeating said forming a first material, said selective removing, and said depositing said second and third materials, such as to form a photonic device having multiple material layers, wherein the photonic device is formed to exhibit a band gap in at least one dimension.

18. The method of claim 17, wherein said photonic device is further formed to exhibit a 2D band gap.

19. The method of claim 18, wherein said photonic device is further formed to exhibit a 3D photonic band gap.

20. The method of claim 17, wherein said forming a first material, said selective removing, and said depositing are repeated to form a photonic device having four material layers with channels formed therein, wherein the channels of each respective material layer are oriented relative to the channels formed in each preceding material layer.

21. The method of claim 20, wherein the channels of each respective material layer are oriented approximately perpendicular relative to the channels formed in each preceding material layer.

22. The method of claim 17, wherein the first layer of material is formed on a substrate, wherein the substrate is substantially comprised of silicon.

23. The method of claim 17, wherein at least a portion of the material layers comprise one or more of the following: Tungsten, Tantalum, Iridium, Molybdenum, Niobium, Platinum, Rhenium, Rhodium, Ruthenium, Silver, Zirconium, Aluminum, semiconductive material, dielectric material, plastic, polymer, ceramic or combinations thereof.

24. The method of claim 17, wherein at least a portion of the first and second materials formed in the channels comprise one or more of the following:
silicon oxide, silicon nitride, silicon oxinitride, tungsten, silicon oxide, tungsten silicon nitride, silicon carbide, amorphous silicon, aluminum nitride, diamond, magnesium oxide, zirconia, hafnia, or alumina, or combinations thereof.

25. The photonic device of claim 17, wherein said photonic device is at least partially periodic.

26. The photonic device of claim 17, wherein said photonic device is at least partially nonperiodic.

27. The photonic device of claim 17, wherein said photonic device is at least partially periodic and at least partially nonperiodic.

28. The method of claim 24, wherein said first and said second materials are deposited by one or more of the following: chemical vapor deposition (CVD), physical vapor deposition (PVD), atomic layer deposition (ALD), molecular beam epitaxy (MBE), sputter, ion and evaporative deposition.

29. The method of claim 17, wherein said selective removing is performed by one or more of the following: drilling processes, laser processes, sand processes, electro-discharge (EDM) processes, or focused ion beam (FIB) processes.

30. A method, comprising:
a step for forming a first material layer by use of one or more deposition processes;
a step for selectively removing at least a portion of the first material layer such as to form one or more channels in the first material layer;
a step for depositing a second material over the first material layer, in the vicinity of the one or more channels, such as to partially fill one or more of the channels; and
a step for depositing at least a third material over at least a portion of the second material, such as to substantially fill the one or more of the channels; and
a step for repeating said forming a first material, said selective removing, and said depositing said second and third materials, such as to form a photonic device having multiple material layers, wherein the photonic device is formed to exhibit a band gap in at least one dimension.

31. The method of claim 30, wherein said photonic device is further formed to exhibit a 2D band gap.

32. The method of claim 31, wherein said photonic device is further formed to exhibit a 3D photonic band gap.

33. The method of claim 30, wherein said step for forming a first material, said step for selective removing, and said step for depositing are repeated to form a photonic device having at least four material layers with channels formed therein, wherein the channels of each respective material layer are oriented relative to the channels formed in each preceding material layer.

34. The method of claim 30, wherein the channels of each respective material layer are oriented approximately perpendicular relative to the channels formed in each preceding material layer.

35. The method of claim 30, wherein the first layer of material is formed on a substrate, wherein the substrate is substantially comprised of silicon.

36. The method of claim 30, wherein at least a portion of the material layers comprise one or more of the following: Tungsten, Tantalum, Iridium, Molybdenum, Niobium, Platinum, Rhenium, Rhodium, Ruthenium, Silver, Zirconium, Aluminum, semiconductive material, dielectric material, plastic, polymer, ceramic or combinations thereof.

37. The method of claim 30, wherein at least a portion of the first and second materials formed in the channels comprise one or more of the following:
silicon oxide, silicon nitride, silicon oxinitride, tungsten, silicon oxide, tungsten silicon nitride, silicon carbide, amorphous silicon, aluminum nitride, diamond, magnesium oxide, zirconia, hafnia, or alumina, or combinations thereof.

38. The method of claim 30, wherein said photonic device comprises a periodic device.

39. The method of claim 30, wherein said photonic device comprises a nonperiodic device.

40. The method of claim 30, wherein said photonic device comprises a quasiperiodic device.

41. The method of claim 37, wherein said first and said second materials are deposited by one or more of the following: chemical vapor deposition (CVD), physical vapor deposition (PVD), atomic layer deposition (ALD), molecular beam epitaxy (MBE), sputter, ion and evaporative deposition.

42. The method of claim 30, wherein said step for selective removing is performed by one or more of the following: drilling processes, laser processes, sand processes, electro-discharge (EDM) processes, or focused ion beam (FIB) processes.

* * * * *

UNITED STATES PATENT AND TRADEMARK OFFICE
CERTIFICATE OF CORRECTION

PATENT NO.        : 7,314,772 B2                                   Page 1 of 1
APPLICATION NO. : 11/080113
DATED             : January 1, 2008
INVENTOR(S)       : Alexander Govyadinov et al.

It is certified that error appears in the above-identified patent and that said Letters Patent is hereby corrected as shown below:

In column 14, line 56, in Claim 17, after "comprising" insert -- : --.

In column 15, lines 32-33, in Claim 24, delete "tungsten, silicon oxide" and insert -- tungsten silicon oxide --, therefor.

In column 16, lines 40-41, in Claim 37, delete "tungsten, silicon oxide" and insert -- tungsten silicon oxide --, therefor.

Signed and Sealed this

Eleventh Day of November, 2008

JON W. DUDAS
*Director of the United States Patent and Trademark Office*